Oct. 11, 1955  A. B. GELLMAN  2,720,208
CONTAINER FOR PERSONAL ITEMS
Filed Aug. 20, 1952  5 Sheets-Sheet 1

Inventor
Allen B. Gellman
By Schroeder, Merriam, Hofgren & Brady
Attorneys

Oct. 11, 1955     A. B. GELLMAN     2,720,208
CONTAINER FOR PERSONAL ITEMS
Filed Aug. 20, 1952     5 Sheets-Sheet 2
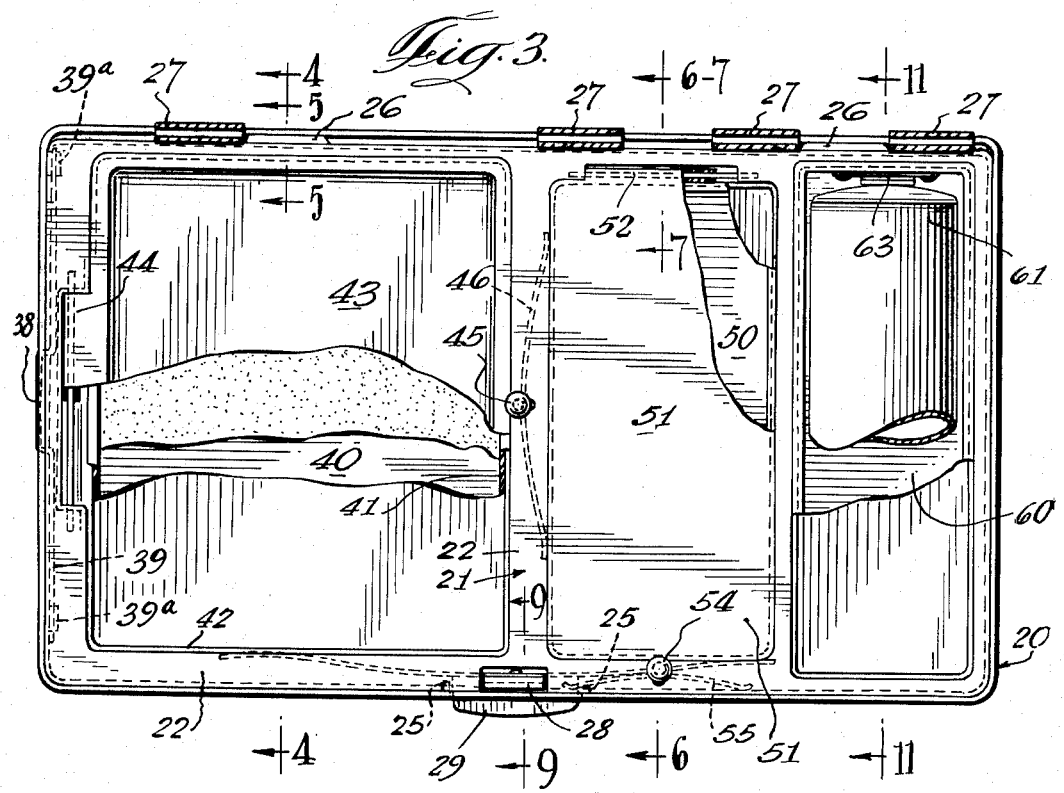
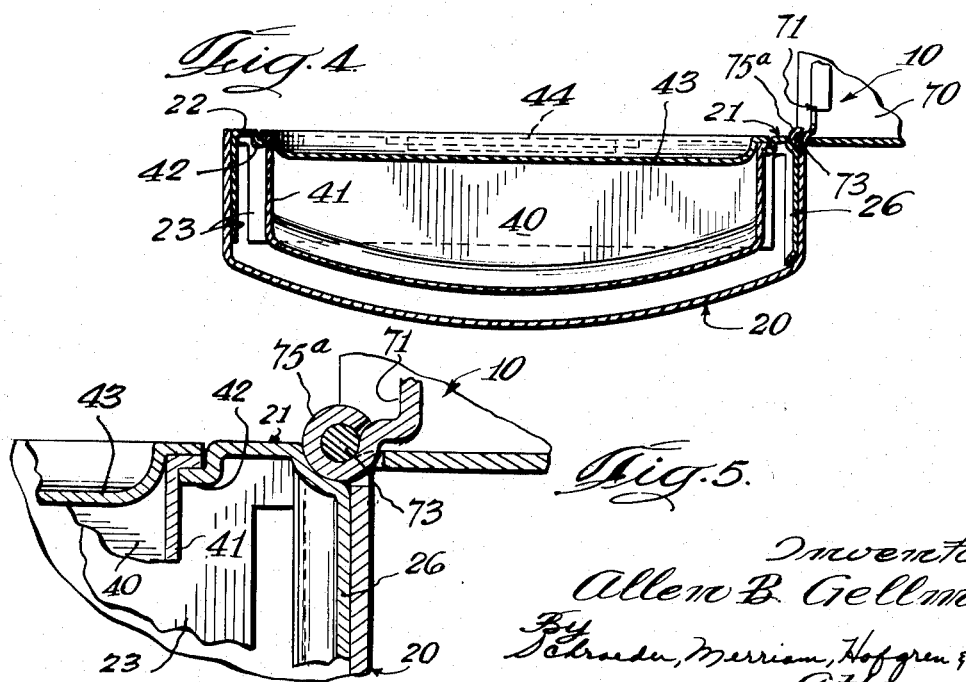
Inventor
Allen B. Gellman

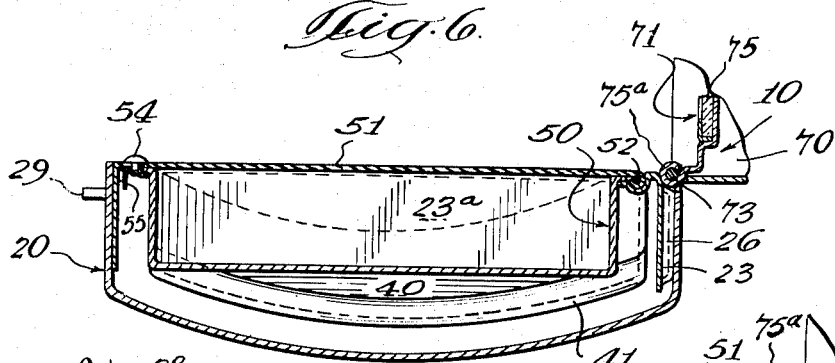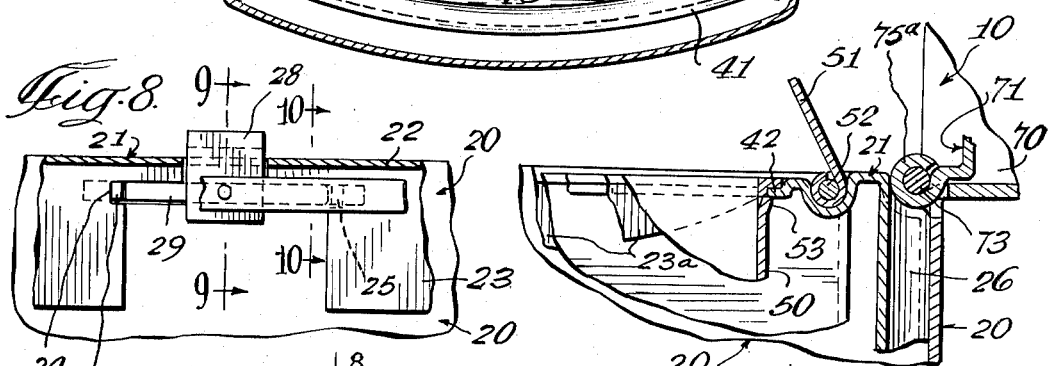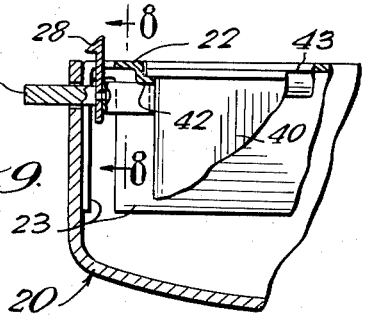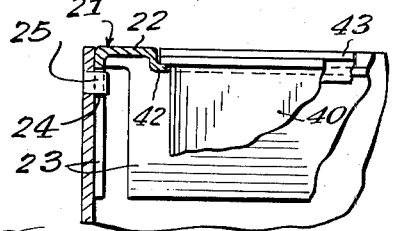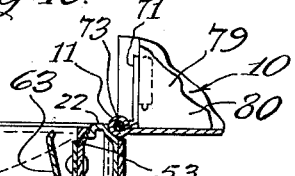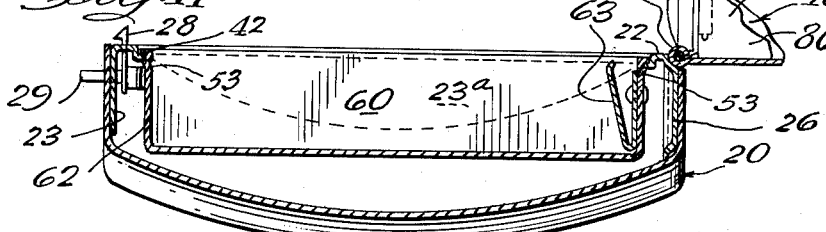

Oct. 11, 1955  A. B. GELLMAN  2,720,208
CONTAINER FOR PERSONAL ITEMS
Filed Aug. 20, 1952  5 Sheets-Sheet 4
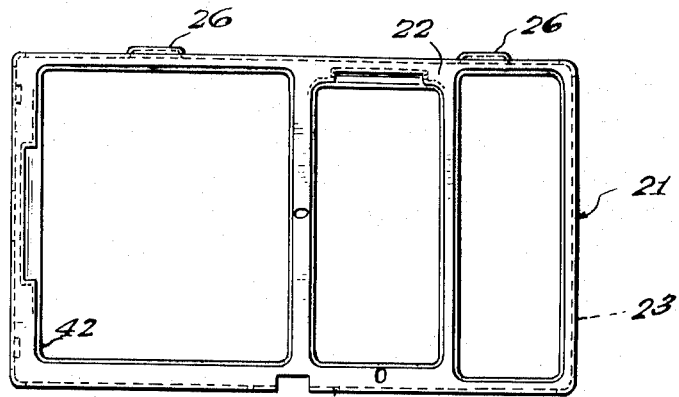
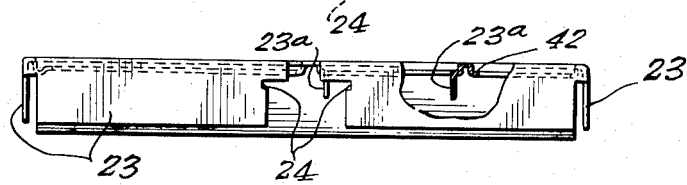
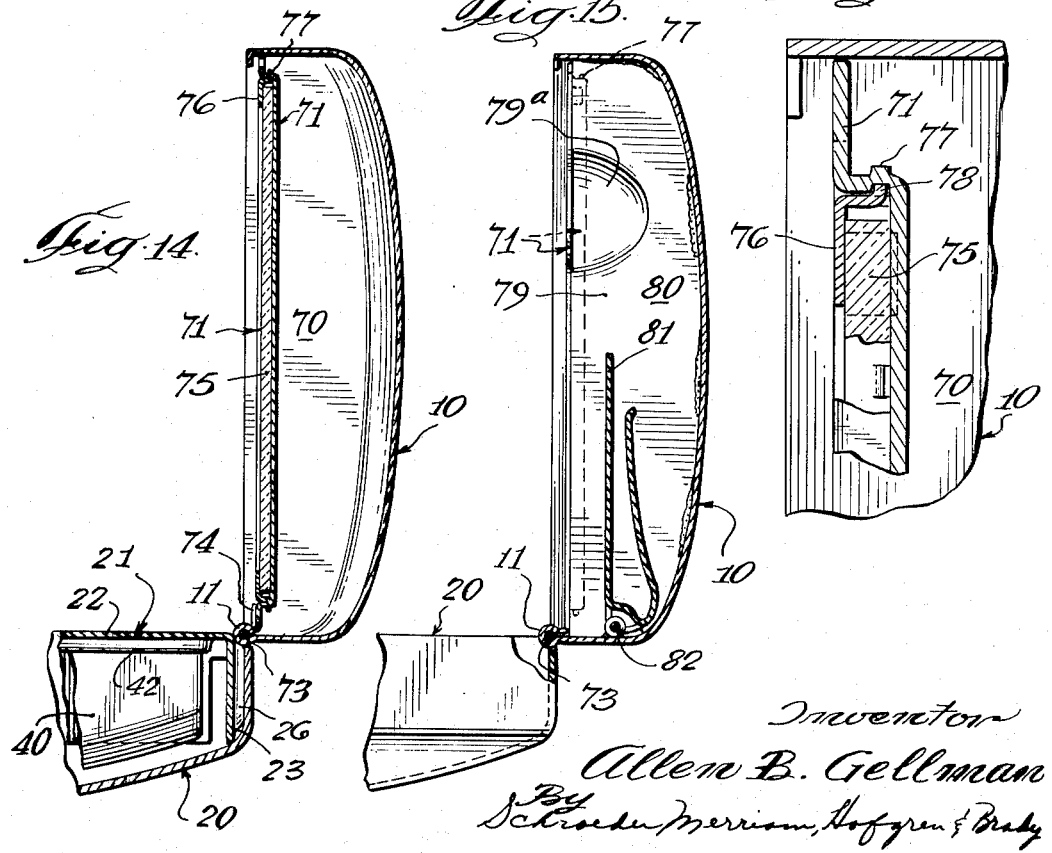

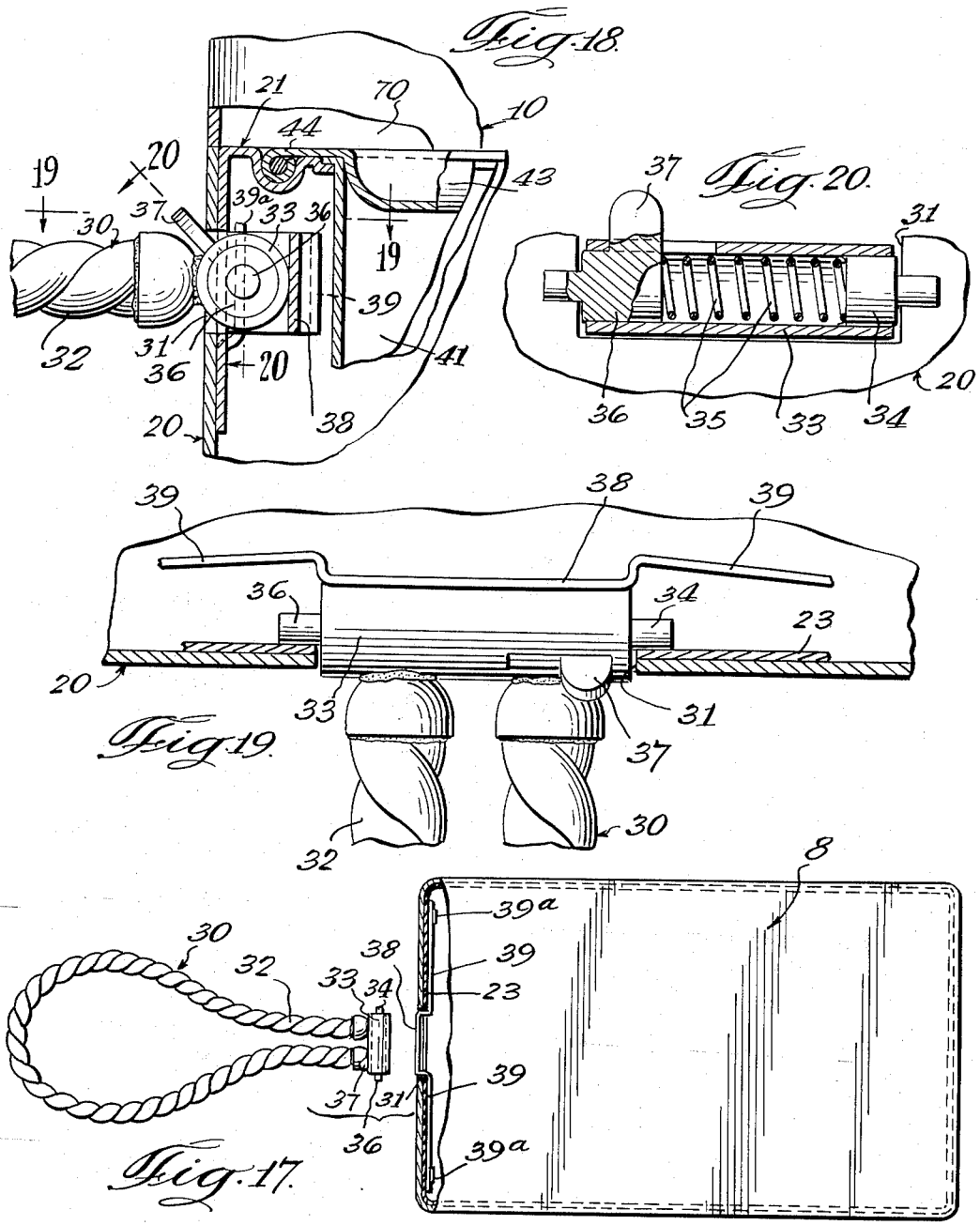

United States Patent Office 2,720,208
Patented Oct. 11, 1955

2,720,208

CONTAINER FOR PERSONAL ITEMS

Allen B. Gellman, Glencoe, Ill.

Application August 20, 1952, Serial No. 305,455

10 Claims. (Cl. 132—83)

This invention relates to a container for personal items and more particularly to an attractive carrying case or "carry-all" for all the personal items a lady may desire during an evening and particularly cosmetics, notions, cigarettes and the like.

Ladies ordinarily prefer to carry a number of personal items with them wherever they go and there is no particular problem in doing so in such instances where fashion dictates the use of a purse or bag. Many purses are of sufficient size to carry even more than the essential cosmetics, hair pins, cleansing tissues, cigarettes, keys, and similar items. For formal occasions ladies generally use a smaller formal purse sufficient in size only to carry the essential personal items. A lady's escort is often requested to carry this formal purse in his pocket and equally as often the purse is of such a shape that it bulges the escort's coat. The present invention provides a rigid metallic container of proper shape for carrying all of these items in a compact manner so that a lady's escort may easily carry it in his pocket without creating an unsightly appearance. Also, the handle is removable so that it may be separately carried if desired and need not protrude from the escort's pocket.

It is accordingly the principal object of this invention to provide a new and novel container for personal items.

A further object is the provision of a container construction of many parts assembled in a novel fashion such that surface marring fastening devices are avoided.

It is also an object of the invention to provide a container for personal items having a novel carrying and handling means whereby the container may be adapted for either pocket or hand carrying.

A further object is the provision of a removable handle for a carrying case in which a signet is provided to maintain an unbroken surface in the case.

A further object is the provision of a novel carrying construction wherein some parts are used in multiple capacities.

Further objects, features and advantages of the present invention will readily be seen from the following description taken in conjunction with the accompanying drawings in which:

Figures 1 and 2 are only slightly smaller than actual size;

Figure 3 is a plan view of the rear part of the case partially broken away and enlarged greater than full size for convenience in illustrating the construction thereof;

Figure 4 is a sectional view through the powder well, taken substantially along line 4—4 in Figure 3;

Figure 5 is a fragmentary enlarged view of the hinge structure adjacent the powder well;

Figure 6 is a sectional view through the pin well, taken substantially along line 6—6 in Figure 3;

Figure 7 is a fragmentary enlarged sectional view of the hinge structure adjacent the pin well;

Figure 8 is a fragmentary front elevational view of the case latching device, taken substantially along line 8—8 of Figure 9;

Figure 9 is a fragmentary sectional view of the latching mechanism of Figure 8, taken substantially along line 9—9 in Figure 8;

Figure 10 is a fragmentary sectional view taken substantially along line 10—10 in Figure 8, showing the projections for locking the platform in the shell;

Figure 11 is a sectional view through the lipstick holding well, taken substantially along line 11—11 in Figure 3;

Figure 12 is a plan view of the platform removed from the casing;

Figure 13 is a side elevational view, partially broken away, of the platform of Figure 12;

Figure 14 is a fragmentary sectional view taken substantially along line 14—14 in Figure 2;

Figure 15 is a fragmentary sectional view taken substantially along line 15—15 in Figure 2;

Figure 16 is a fragmentary enlarged sectional view of the mirror construction, taken substantially along line 16—16 in Figure 2;

Figure 17 is a plan view partially broken away of the carrying case and handle with the handle in a position just removed from the case;

Figure 18 is a fragmentary enlarged view of the handle secured to the case;

Figure 19 is a fragmentary sectional view through a portion of the handle, taken substantially along line 19—19 in Figure 18; and Figure 20 is a fragmentary sectional view through a portion of the handle taken substantially along line 20—20 in Figure 18.

Figure 1:
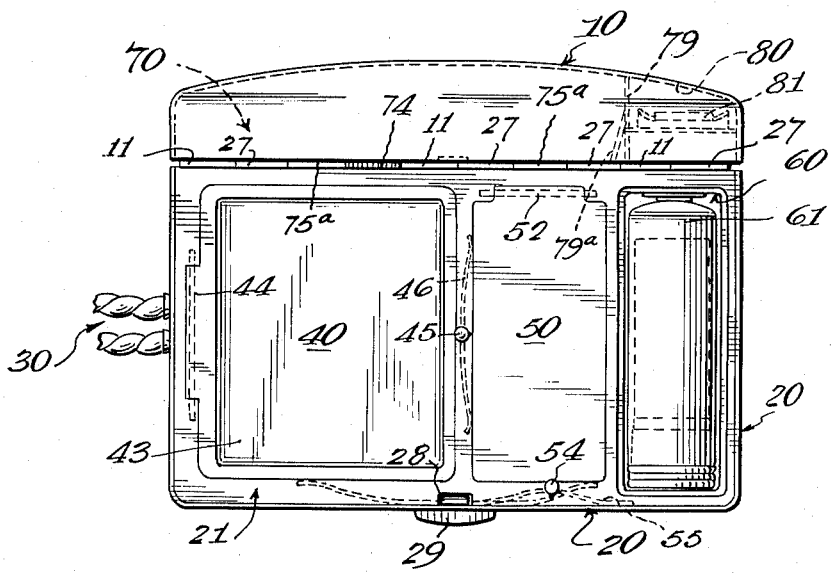
Figure 1 is a plan view of the carrying case of the invention looking toward the rear shell.
Figure 2:
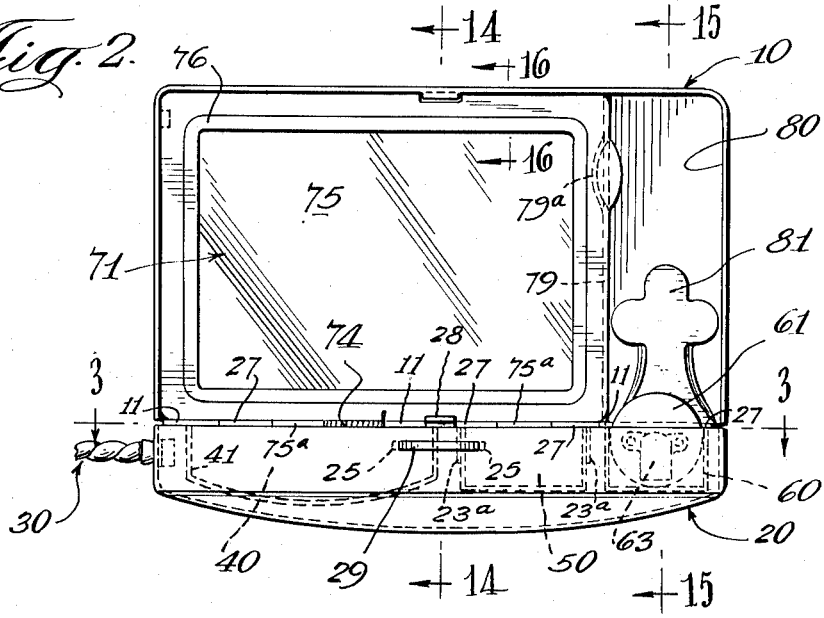
Figure 2 is similar to Figure 1 looking toward the front shell.

A general picture of the container can be readily acquired by examining Figures 1 and 2 which show the container in plan views with one half at approximately right angles to the other half. Specifically, a front shell 10 is joined by a hinge structure to a rear shell 20. The handle 30 is joined to the rear shell near a free edge thereof for the purpose of carrying the container. The shells may be constructed of jeweler's bronze, sterling silver, other precious metal and other materials such as those of the plastic family. The outer surfaces may be decorated with various pleasing designs or given a highly polished appearance or other finishes. For the "carry-all" container, each shell has a base portion and upwardly extending flange portions which are made of a size to mate with the flange portions of the other shell.

The interiors of the shells are divided in a manner to permit placement of several different items within the container without danger of commingling these items. In the rear shell, a compartment 40 is provided for either loose powder or a powder cake. Next to the powder well is provided a compartment 50 for hair pins of any desired type. In the same shell is provided a well 60 for containing packaged commercial lipstick 61 held in position by a spring member.

The front shell 10 is also divided into compartments. One divider 79 separates the front shell into a compartment 70 for containing cigarettes and a compartment 80 in which a spring clip 81 is provided for holding a small handkerchief or facial tissue. A door is provided on the cigarette compartment and also serves to hold a mirror 75.

When the front and rear shells of the container are closed and latched together, they form a closed container such as illustrated in Figure 17 and generally designated 8. The handle 30 is detachable from the container 8 so that they may be placed separately in a pocket without protruding therefrom. A particular application is the use of the container for formal wear. A lady may have all essential items with her in the container and still at the same time, make it easy and convenient for her escort to carry the container in his pocket since the handle may be readily removed.

The details of the handle construction are best seen in Figures 17 to 20. A suitable opening 31 is provided in the end wall of one of the shells of the container, in this instance the rear shell, for reception of the handle. A cord 32 is connected with a tubular, hollow base member 33 and forms a loop to be grasped by the hand. The tubular member 33 has a fixed stud 34 at one end against which a coiled compression spring 35 bears in order to yieldingly urge a movable stud 36 outwardly of the tubular member. A detent 37 on the movable stud 36 extends through an opening in the tubular member so that it may be actuated with the finger or thumbnail. As will be evident from reading the above description, the movable stud is withdrawn into the tubular member whereupon the base of the handle may be inserted through the opening 31 in the container shell. Upon release of the finger piece or detent 37, the studs 34 and 36 pivotally secure the handle to the container.

At the option of the user, the handle 30 may be dispensed with in which case the container is provided with a signet to close the otherwise present opening 31. This signet member has a face portion 38 to enter and fill the opening 31 when the handle is not present. Adjoining leaf spring portions 39 are slidingly received in loops 39a formed in the container structure and are of spring metal so as to urge the signet portion 38 toward the opening 31. Thus, the opening is always closed by the signet when the handle is removed and the container presents a comparatively smooth outer surface.

An important part of the construction of the present container for personal items, is the structure which permits the separate parts to be assembled without surface marring fastening and holding means usually referred to in the trade as "dinks." In Figures 3 to 11 there is shown the structure of the platform which is inserted in the present container, within the rear shell. This platform as it appears removed from the container, is best seen in Figures 12 and 13. The platform generally indicated 21 has an upper face 22, depending flange portions 23 and bracing fins 23a. Appropriate openings are formed in the face portion 22 for receiving various compartment wells. At the front of the platform is formed a pair of opposed notches 24 in the depending front flange. These notches are located to be positioned on either side of the latch mechanism for closing the container. In Figure 10, projections 25 are shown as turned inwardly to repose within the notches 24 to hold the platform within the rear shell.

There is also a holding structure on the opposite side of the case cooperating with the projections 25, to secure the platform in proper place. Pairs of bosses 26 are struck from the flange 23 at the rear of the platform in such a manner that they extend vertically and are of a width substantially equal to the width of one of the pintle bearings connecting the front and rear shells. The bosses extend outwardly a distance sufficient only to rest inside the rear shell when the front flange is properly fastened as described above. In assembling the platform in the rear shell, the bosses 26 slide downwardly inside the rear shell 20 between pintle bearings 27 on the rear shell and below the level of the pintle bearings. When the front shell is attached to the rear shell, its pintle bearing 11 and a pintle bearing 75a of the mirror door will repose just above the bosses and keep them from moving upwardly out of the rear shell (Fig. 5). The use of the projections and bosses for locking the platform in place does away with all visible fastening means. There is no part of the platform extending out of the shell and no visible "dinks" or other fastening devices.

A latch member 28 is spring biased and provided with a thumbpiece 29 for opening and latching the shells. The details of the latching member are conventional and best seen in Figures 8 and 9 as they relate to the construction of the rear shell.

It will be noted that the construction of the powder well seen in Figures 3 to 5 indicates that a well 41 is mounted within an opening formed by a flange portion 42 of the platform and is provided with a closure or door 43 hinged to the platform at 44. The powder well is positioned in the platform within the rear shell and is provided with its own closure thus securing the powder from spilling. A fastener button 45 is biased by spring 46 to hold the door 43 in closed position.

The hair pin well 50 (Figures 3, 6 and 7) is formed similarly to the powder well except that the hinge 52 for the door 51 is formed adjacent the hinges of the two shells and the well is fastened into an opening in the platform by projections 53. Here also a catch button 54 is biased by a spring 55 to maintain the door of the pin well closed.

The lipstick well is best seen in Figure 11 and includes a container 62 which is upwardly open and is fastened in an opening in the platform 21. At one end a spring member 63 is provided for retaining an ordinary lipstick in the container 62. This compartment could, of course, be used for other purposes if desired.

The structure of the front shell of this particular container is divided into only two compartments, one for cigarettes and the other for facial tissue. In Figure 14 a door member 71 is shown as hinged on the pin 73 about which the pintle bearings 11 and 27 of the respective shells are also hinged. This door is spring biased to closed position in the front shell and the spring 74 may be clearly seen in Figure 2. The door 71 is so formed that it contains a glass mirror 75 held in position by a bezel 76, the particular construction of which is shown in Figure 16. The door 71 is formed with a peripheral outwardly punched base 77 in which the edge 78 of the bezel may repose to secure the mirror 75. Since the door is spring biased to closed position, it serves the dual function of holding the mirror and retaining cigarettes within the compartment. A finger recess area 79a is provided in the wall 79 at one edge of the door so that it may be easily opened.

The other compartment 80 of the front shell is provided with a spring clip 81 hinged within the front shell on a pin 82 so that it may be swung outwardly about the pin to receive a handkerchief or facial tissue. When the clip is in the position shown in Figure 15, the tissue will repose within the front shell 10.

It is believed evident that from the foregoing description, I have invented a new container for personal items which permits the simultaneous carrying of many cosmetics and the like which ladies desire to have with them on most occasions. The use of this container obviates the necessity of a purse and provides means for carrying the various items in a compact space. A novel handle arrangement is provided whereby it may be removed or attached to the case at the whim of the user.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A container for personal items, comprising: a pair of hingedly connected shells having mating edges whereby the container may be opened and closed; dividing means defining compartments within the container for receiving personal items; a carrying handle including a base and a portion to be grasped by the hand, said base including an elongated hollow member with a spring-biased bar extending outwardly from within said member, one of said shells having an elongated opening of a size to receive the hollow member with the bar less than fully extended therefrom, said hollow member being housed within said shell with the hand grasping portion extending outwardly through said opening; and a manually operable detent on said bar and extending upwardly through the hollow member for retracting said bar against said spring to within the member to permit selective attachment and removal of the handle by passing the hollow member through said opening.

2. A container for personal items, comprising: a pair of hingedly connected shells having peripheral mating edges whereby the container may be opened and closed; means within the container dividing the space into at least two compartments for receiving desired materials and objects; and a handle for carrying said container including a tubular member housed within the container and having an axially slidable bar disposed therein so that the bar extends beyond the end of the member, spring means yieldingly urging the bar outwardly of the tubular member, a stud extending outwardly of the opposite end of said member, said container having an opening in one side thereof of sufficient width to receive only said tubular member and stud, manually operable means for withdrawing said bar to a position within the tubular member and means for securing a handle to said tubular member whereby the handle may be selectively attached and removed from the container.

3. A container as set forth in claim 2 wherein said slot in the container side wall is filled in when the handle is removed therefrom, said container having a closure member positioned to enter and fill said slot when the handle is removed and spring means are provided for yielding urging said signet into the slot.

4. A container as set forth in claim 3 wherein said closure member comprises a main body portion for entering the slot and leaf-spring extensions on opposite sides thereof slidingly supported in a portion of said container side wall.

5. A container for personal items, comprising: a hollow shell having a bottom and upstanding side walls; a closure member hingedly attached to the shell with peripheral edges mating with the side walls of the shell when the container is closed; and a removable carrying handle secured to the container, said handle having a hand grasping loop and a base attached thereto, a retractable pin in said base whereby the length of the base may be varied, and said shell having an elongated opening therein of a size to receive and pass said base to the interior of the shell when the pin therein is retracted whereby the handle may be selectively attached to and removed from the container.

6. A container as set forth in claim 5 wherein a closure member is provided overlying said elongated opening in the shell and spring members yieldingly urge said closure member toward closing position in the opening.

7. A container for personal items, comprising: a hollow shell having a bottom and upstanding sidewalls; a closure member for the shell; spaced pintle bearings along mating edges of the shell and closure member hingedly securing them together; and a platform locked in said shell, a portion of the platform being disposed beneath an inwardly projecting portion of the shell on one side formed at the edge of an opening in the shell so as to avoid marring the outer shell surface and another portion of the platform being disposed under at least one of said pintle bearings of the closure member at the opposite side of the shell to cooperatively secure the platform in the shell.

8. A container for personal items, comprising: a hollow metallic shell having a bottom and upstanding peripheral side walls; a plurality of spaced pintle bearings formed along the upper edge of one side wall; a closure member having pintle bearings secured in aligned position with the pintle bearings on said shell and peripheral edges mating with the upper edges of said side walls when the container is closed; a platform having a face portion and downturned peripheral flanges on opposite sides thereof spaced apart a distance to closely fit into the shell between its side walls; and means locking said platform in said shell including inturned projections on the front side wall of the shell adjacent an opening therein to avoid visible shell surface marks and with the flange of the platform at the front side wall having notches therein embracing the projections and a pair of bosses on the opposite flange extending outwardly of the platform to repose under the pintle bearings of the closure member.

9. A container for personal items, comprising: a metallic shell having a bottom and upstanding peripheral side walls; spaced pintle bearings formed along the upper edge of one side wall; a closure member having pintle bearings secured in aligned position with the pintle bearings on said shell and mating edges for closing the container; a platform insert having a face portion and peripheral flanges adapted to fit within the side walls of the shell; and means locking said platform in said shell including a front flange having portions providing notches and inturned projections on the front side wall of the shell extending into the notches, said projections being formed of shell metal turned inwardly adjacent an opening in the shell, and at least one boss on the opposite flange extending outwardly of the platform to repose under the pintle bearings of the closure member.

10. A container for personal items, comprising: a front shell having spaced hinge pintle bearings along one edge; a rear shell having hinge pintle bearings positioned thereon for alignment with the pintle bearings on the front shell when the shells are placed together, said shells when closed providing a container of a size to easily fit in a person's pocket; a pin reposing in said aligned pintle bearings and hingedly securing said shell together; a platform in the rear shell having a face portion and peripheral flange portions extending from the face portion inwardly of the shell, said platform having a size to snugly fit within the shell; and means locking said platform in the shell without being visible on the outer surface of the shell including a pair of bosses on one flange portion of the platform positioned under a pair of pintle bearings of the front shell and a pair of projections extending inwardly from the opposite side of the shell bordering an opening formed in the shell adapted to receive a catch member, said projections being shell portions turned inwardly with the platform flange adjacent the projections having slots to embrace the projections whereby movement of the platform out of the shell is prevented by said pintle bearings and projections.

References Cited in the file of this patent

UNITED STATES PATENTS

| | | |
|---|---|---|
| 1,631,964 | Kasdan et al. | June 14, 1927 |
| 1,883,793 | Johnson | Oct. 18, 1932 |
| 2,007,538 | Kraemer | July 9, 1935 |
| 2,087,056 | Bowen | July 13, 1937 |
| 2,437,335 | Shapiro | Mar. 9, 1948 |
| 2,601,158 | MacGillivary | June 17, 1952 |